G. MARCHETTI.
ART OF PRODUCING IMPROVED COLOR EFFECTS IN THE MANUFACTURE OF TAPESTRY CARPETING, &c.
No. 10,890. Reissued Dec. 20, 1887.
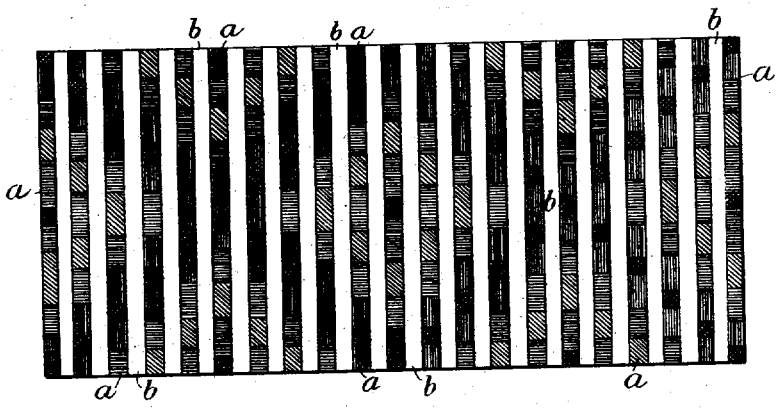
Witnesses
Will T. Norton
A. Lockhart
Inventor
Giulio Marchetti
By his Attorneys
John J. Halsted Son
N. PETERS, Photo-Lithographer, Washington, D. C.

UNITED STATES PATENT OFFICE.

GIULIO MARCHETTI, OF HALIFAX, COUNTY OF YORK, ENGLAND.

ART OF PRODUCING IMPROVED COLOR EFFECTS IN THE MANUFACTURE OF TAPESTRY CARPETING, &c.

SPECIFICATION forming part of Reissued Letters Patent No. 10,890, dated December 20, 1887.

Original No. 363,900, dated May 31, 1887. Application for reissue filed October 15, 1887. Serial No. 252,509.

*To all whom it may concern:*

Be it known that I, GIULIO MARCHETTI, a subject of the Queen of Great Britain, residing at Halifax, in the county of York, England, have invented a new and useful Art of Producing Improved Color Effects in the Manufacture of Tapestry Carpeting, &c., of which the following is a specification.

My invention consists, first, in an art or method of producing improved color effects in the manufacture of tapestry carpeting, tapestry-velvet carpeting, rugs, and other printed terry and cut-pile fabrics, whereby I am enabled not only to produce a novel and distinguishing effect in the appearance of the face of such carpeting, which effect I term "sheeny" or "variegated," but to produce these fabrics in a very economical manner in a great variety of colors, and, secondly, in the improved fabric produced thereby.

By my invention, as will hereinafter appear, I am enabled to produce my improved goods at a less cost than the ordinary printed tapestry and tapestry-velvet carpets, rugs, and other printed terry and cut-pile fabrics at the same time that I obtain novel effects in design and variegated coloring.

Tapestry and tapestry-velvet carpets, rugs, and other printed terry and cut-pile fabrics have hitherto usually been composed of a pile warp, of worsted or other suitable material for forming the face, and of a binding-warp, and in some cases of a stuffing-warp, both of suitable material, for forming the back of the fabric, the face-warp and the back warp or warps being bound together by weft of suitable material.

The whole of the threads forming the pile warp have hitherto been rendered party colored by being printed with the various colors required by the design, (with the exception of some plain threads used for forming the ground of the design or for dividing or marginal lines in stair-carpets, or in the borders of carpets or other similar fabrics,) and each thread has usually consisted of two or more two-fold threads, slightly twisted together, each complete thread thus formed being printed, as desired, in the manner well known to those engaged in the trade.

In carrying out my invention, instead of forming the whole of the pile warp of printed party-colored threads, I insert between the party-colored printed threads self-colored threads, which are arranged either alternating one and one with the printed threads, or alternating otherwise, with the party-colored yarn in small groups at such distances from one another and with such a number of intervening printed threads as may be required to produce the desired effect, which I term a "sheeny" or "variegated" effect. The proportion of self-colored threads to printed threads is uniform across the fabric, or across that portion thereof where the improved effect is produced. These self-colored threads are drawn into the reed and healds of the loom in exactly the same manner as if they were ordinary party-colored printed threads.

The self-colored threads are manufactured in the usual manner, which is well known, and are composed of any suitable material or materials dyed of a uniform color throughout their length. I may in some cases combine two or more self-colored strands of different shades or colors to form a single mottled yarn, the number of threads of each color forming the complete mottled thread being varied at will.

The accompanying design will serve to illustrate my method of forming the pile warps partly of printed threads and partly of mottled or self-colored threads.

*a a a* represent the ordinary party-colored printed threads, which are printed to form the required pattern, the different colored parts being represented by hatched lines.

*b b b* represent mottled or self-colored threads, which in the illustration are shown used alternately with the ordinary printed threads *a a a*. These self-colored or mottled threads do not form distinct portions of the figure or pattern of the carpeting. The figure or pattern is entirely produced by the printed or party-colored threads, and remains essentially unchanged in respect of outline, whatever be the color, &c., of the self-colored threads employed; but the latter produce a species of general ground color or effect, controlling throughout the entire carpeting its general effect or appearance. Heretofore party-colored or printed threads and self-colored threads, when employed together in the same carpeting, have been employed in such a manner that each has formed distinct portions of the pattern or design, or that the combination has served to produce simply a general mottled effect without any ornamental design.

By my improved mode of manufacture I am enabled to produce different carpetings having many different effects of color without altering the design of the party-colored printed warp-threads by simply varying the colors of the mottled or self-colored threads, a change in these alone altering completely the general tone and appearance of the carpeting; and by inserting mottled or self colored threads, as above described, I am enabled to produce with economy improved carpets and like goods in great variety.

The economy in my method of fabrication (independent of and aside from the variety and beauty of effects resulting from it) will be readily understood when it is remembered that in the class of tapestry and tapestry-velvet goods as heretofore made the costly party-colored threads compose or constitute the whole of the pile warp; but in my method I dispense with a large part of this cost, and to almost any degree desired. For instance, if one-half of the warp-threads be not party-dyed, but be plain, (*i. e.* self-dyed,) or be mottled, (*i. e.* plain threads of different colors slightly twisted together,) then it is evident that there is saved in cost all the difference between the value of the party-colored threads dispensed with and that of the self-dyed or mottled threads substituted for them, and that a given quantity of party-colored threads will in such case suffice for weaving two yards instead of only one yard of carpet.

It will be equally evident that by using still less of the expensive party-colored threads the economy may be further increased, while producing still further variation in effects, and by using more the economy will be less and the effects still different and attractive.

Having now particularly described the nature of my said invention and the manner of performing the same, what I claim is—

1. The art or method of producing improved color effects in the manufacture of tapestry and tapestry-velvet carpeting, rugs, and other printed and cut-pile fabrics, which consists in disposing mottled or plain self-colored warp-threads among the usual printed face-warp threads of such carpeting, alternating such self-colored warp-threads with the individual printed warp-threads or small groups thereof, and interweaving all such warp-threads into a fabric in the usual manner, all substantially as described.

2. As a new article of manufacture, tapestry carpeting having the figures produced by usual printed warp-threads and having the color and effect of its figured surface toned and varied by mottled or plain self-colored warp-threads interwoven in the fabric alternately with individual printed warp-threads or groups of such threads, substantially as described.

GIULIO MARCHETTI.

Witnesses:
H. NORMAN MELLOR,
JOSEPH BROOKE DEWHIRST.